372-21 SR

XR 3,165,690 [redacted]

CROSS REFERENCE

Jan. 12, 1965 I. KAUFMAN 3,165,690

HARMONIC GENERATOR UTILIZING A NONLINEAR REACTANCE

Filed Dec. 12, 1960

3 Sheets-Sheet 1

IRVING KAUFMAN
INVENTOR.

BY George C. Thompson, Jr. agent

IRVING KAUFMAN
INVENTOR.
BY George C. Thompson Jr.
Agent

IRVING KAUFMAN
INVENTOR.

BY George C. Thompson, Jr.
agent 3,165,690
Patented Jan. 12, 1965

3,165,690

HARMONIC GENERATOR UTILIZING A NONLINEAR REACTANCE

Irving Kaufman, Woodland Hills, Calif., assignor to Thompson Ramo Wooldridge Inc., Canoga Park, Calif., a corporation of Ohio Filed Dec. 12, 1960, Ser. No. 75,413
12 Claims. (Cl. 321—69)

This invention relates to a harmonic generator, and more particularly to a harmonic generator using a nonlinear reactance and cooperating resonant circuits.

The generation of microwave frequencies has required relatively bulky power supplies. Where weight is important, it has become necessary to generate lower frequencies, and then generate the microwaves by harmonic multiplication. Limitations in the coefficient of nonlinearity of the elements generating the harmonic have, in the past, required several stages of harmonic multiplication in cascade, each using a nonlinear element. Structures of this nature thus necessarily are complex, bulky, and expensive, and involve relatively large power inputs due to the losses incurred in the plurality of stages.

Utramicrowave frequencies are most readily generated by the interaction of microwave energy with nonlinear materials. In the techniques realized to date, all these nonlinear elements are lossy. It can be shown that in generating an output harmonic that is higher than the second harmonic of the input frequency, because of material losses at this input frequency, it is advantageous to use a two-step process of harmonic generation. For example, under many circumstances it is more efficient to generate $3\omega$ by first generating $2\omega$, then mixing this $2\omega$ signal with $\omega$ to achieve $3\omega$. This double conversion can be carried out with one nonlinear element and a triple resonant circuit.

It is therefore an object of this invention to provide a harmonic generator directly producing the desired output frequency.

It is another object of this invention to provide a harmonic generator utilizing high circulating harmonic currents for developing the desired output frequencies.

It is still another object of this invention to provide a harmonic generator capable of producing high frequency signals without the use of cascade multiplying circuits.

It is another object of this invention to provide a harmonic generator of compact nature and capable of developing a relatively high output power.

Other objects, purposes, and characteristic features will become obvious as the description of the invention progresses.

In practicing the invention, there is provided a resonant circuit structure or chamber capable of resonance at a fundamental frequency and at two or more harmonic frequencies. The circuit structure is provided with a signal input, one or more signal output couplers, a nonlinear element, means for tuning the structure to resonance at the various harmonic frequencies, and means for adjusting the amounts of coupling to input and output circuits.

Figure 9:
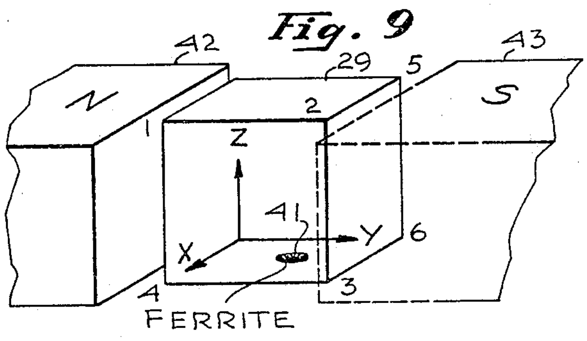
FIG. 9 is a view illustrating another embodiment of this invention, utilizing a ferrite for harmonic generation.
Figure 10A:
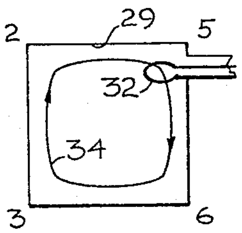
Figure 10B:
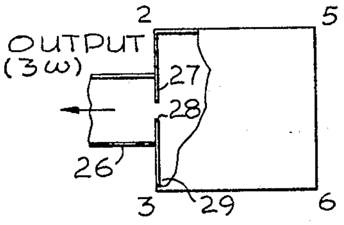
Figure 10C:
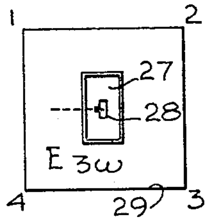
Figure 10D:
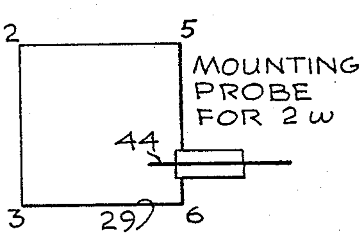
Figure 11A:
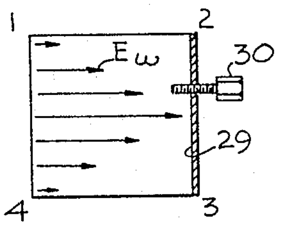
Figure 11B:
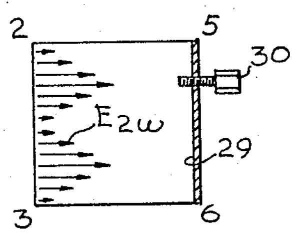
Figure 11C:
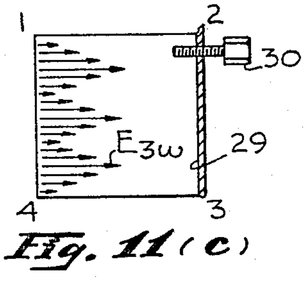
Figure 12A:
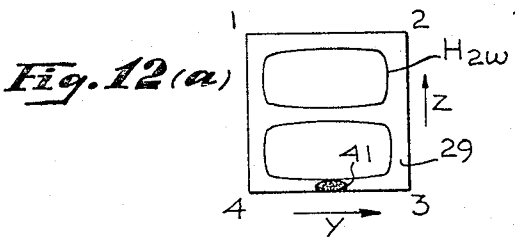
Figure 12B:
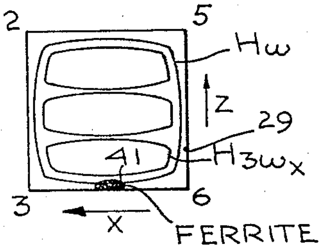
Figure 13:
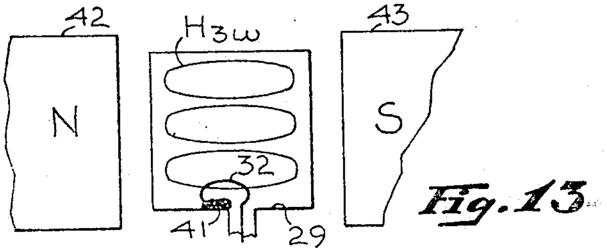

FIGS. 10(*a*), 10(*b*), 10(*c*), and 10(*d*) illustrate the input, output, and probe circuits usable in the embodiment of FIG. 9;

FIGS. 11(*a*), 11(*b*), and 11(*c*) illustrate the electric fields established in the embodiment of FIG. 9 for the different frequencies;

FIGS. 12(*a*) and 12(*b*) illustrate the magnetic field developed within the embodiment of FIG. 9; and FIG. 13 illustrates a different type of input probe usable in the embodiment of FIG. 9.

In each of the several views, similar parts bear like reference characters.

As mentioned above, there are two advantages to harmonic multiplication with the use of idling circuits. In brief, the advantages are illustrated in the comparison of FIGS. 1 and 2.

Figures 1, 2:
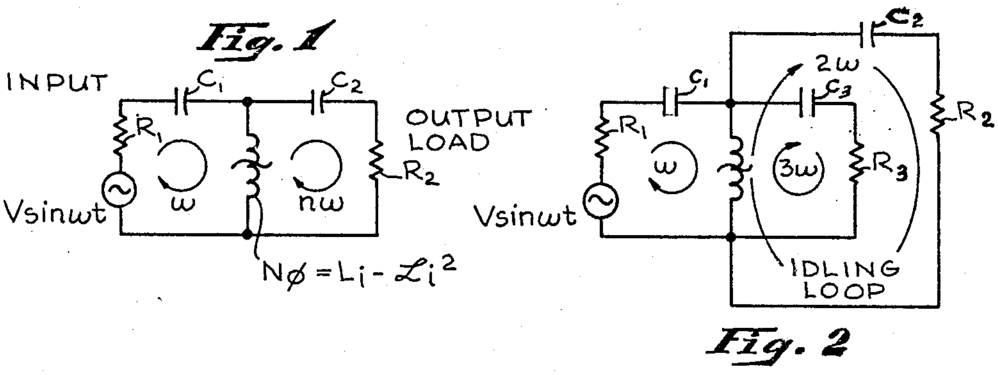
FIGURE 1 illustrates one system of harmonic generation without the use of idling circuits.
FIG. 2 illustrates a system of harmonic generation using an idling circuit.

In FIG. 1, a lossless monlinear inductance is used in circuit loops $\omega$ and $n\omega$ to create currents of angular frequency $n\omega$ which generate output power in load $R_2$, at this frequency. The loop $\omega$ is provided with a capacitor $C_1$, resistor $R_1$, input source $V \sin \omega t$, and the nonlinear inductance. The loop $n\omega$ is provided with a capacitor $C_2$, load resistor $R_2$, and the nonlinear inductance. If the nonlinear inductance has "square law" characteristics, $N\phi = Li - \zeta i^2$, where N, L, and $\zeta$ are constants, and where $\phi$ and $i$ are the instantaneous deviations of flux and current from a static operating point, then it is known that negligible harmonic output power (at $n\omega$) can be obtained if $n>2$.

To generate harmonic power at $n=3$, we use the circuit structure of FIG. 2, which contains a $2\omega$-idler loop including a capacitor $C_2$, resistor $R_2$, and the nonlinear inductance. Now the fundamental ($\omega$) current in the nonlinear inductance creates a $2\omega$-current in this loop. This, in turn, mixes with the $\omega$-current in the nonlinear inductance to generate $3\omega$ power, which is dissipated in the output circuit including the capacitor $C_3$, nonlinear inductance, and load resistor $R_3$.

This concept can be employed also if the nonlinear inductance is replaced by a nonlinear capacitance or nonlinear resistance, provided the proper linear tuning elements are also added.

In this example, only a "square law" device has been considered. Should the characteristics of the nonlinear device be of "higher order," the idea can always be employed to generate higher harmonics than could be generated by the two-loop circuit.

The second advantage that accrues from the use of the idling circuit in harmonic generation applies to those cases in which the nonlinear element has considerable input frequency losses, as at high microwave frequencies. Here it is frequently desirable to convert considerable amounts of power to a harmonic frequency, using a material that has nonlinear characteristics (in bulk). To keep from "saturating" the material and limiting its conversion ability, it is necessary to use a relatively large volume. It can be shown that if a harmonic is to be generated by the equivalent of the two-loop circuit of FIG. 1, assuming the proper degree of nonlinearity exists, the curves of harmonic output power $P_{n\omega}$ vs. material volume are as in FIG. 3.

Accordingly, for $n>2$, an optimum, though small, volume exists (see curve $n>2$), so that the power output is limited by the saturation effects mentioned above. This is not the case for $n=2$ (see curve $n=2$).

Figure 3:
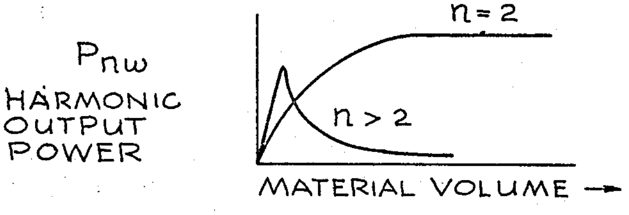
FIG. 3 is a plot of harmonic power against material volume for different harmonics.

However, if $n=3$ or 4, by using the equivalent of the circuit of FIG. 2 (idling circuit), the curve of $P_{3\omega}$ or $P_{4\omega}$ vs. material volume has the shape of that for curve $n=2$ of FIG. 3. Therefore, by using the idler circuit technique, the saturation limitation has been avoided.

Figures 4, 5:
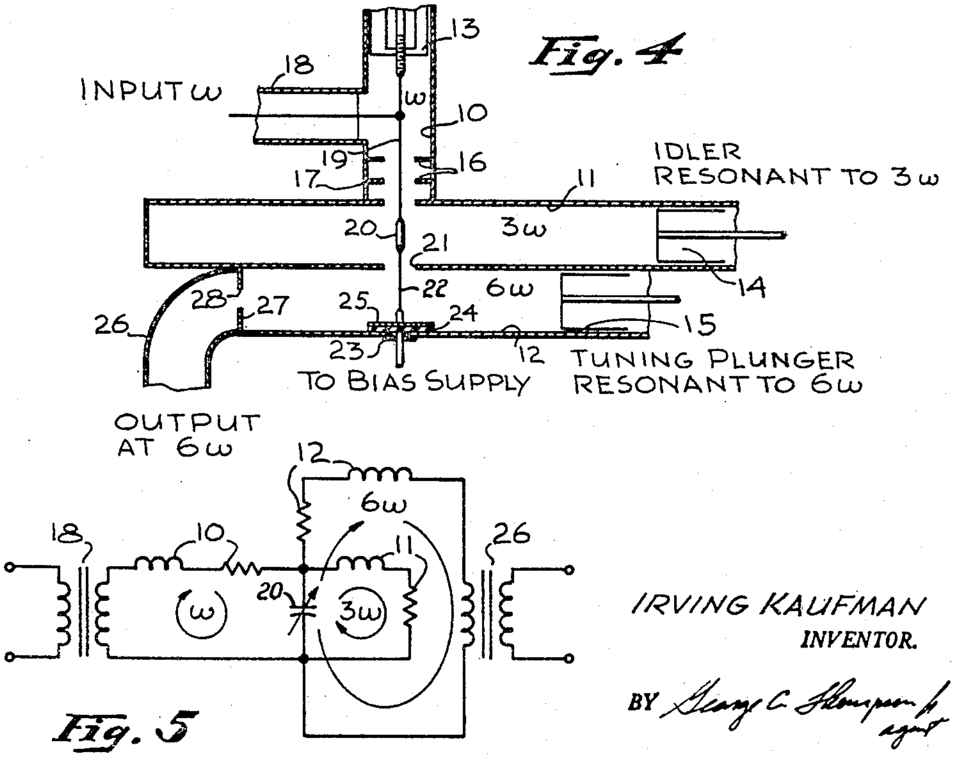
FIG. 4 shows one embodiment of the invention capable of developing the third and sixth harmonics of the input frequency.
FIG. 5 is an equivalent circuit for the device of FIG. 4 showing the use of one or more loop circuits.

In the embodiment of FIG. 4, there are provided three resonant chambers 10, 11, and 12 capable of being tuned by adjustable members or plugs 13, 14, and 15, respectively, to the frequencies of the input frequency $\omega$, the harmonic $3\omega$, and the harmonic $6\omega$, respectively. The resonant chamber 10 may take the form of any suitable wave guide or coaxial cable provided with RF chokes 16 constructed of any suitable material, such as copper, and attached to the shielding 17 of the coaxial cable forming the resonant chamber 10. The chamber 10 is tuned to resonance at frequency $\omega$ by the member 13. The resonant chamber 10, of the coaxial cable, is provided with an input coaxial member or conductor 18 connected to a source (not shown) of frequency $\omega$. The input frequency $\omega$ source is connected to an input conductor 19, which is in turn connected to a nonlinear reactance member 20. The member in this case may be a semiconductor diode, as shown in FIG. 4, which is operated in the nonconducting state, so that it acts as a capacitor whose values varies with instantaneous diode voltage. The diode 20 is positioned within the resonant chamber 11, which is called an idler chamber, and adjusted by the member 14 to be resonant to the third harmonic of the input frequency $\omega$. The chamber 11 is shown, for the sake of convenience, to be a portion of a wave guide having only one adjustable end or member 14. The idler resonant chamber 11 is provided with an opening 21 into the resonant chamber 12, tuned to $6\omega$. The resonant chamber 12 is also a portion of a wave guide and is tuned to $6\omega$ by the movable member 15.

The diode 20 is provided with a lead 22 which extends through the opening 21 into the resonant chamber 12 and through a second opening 23 in the resonant chamber 12 to the outside of the chamber for connection to a suitable bias supply (not shown). The bias supply is provided for certain reactive elements which require such bias voltage. It is pointed out, however, that the element used may not require a bias, in which case no connection to a supply is made. The lead 22 to the diode 20 is insulated from the resonant chamber or cavity 12 to provide for D.-C. bias isolation from the resonant chamber walls. Insulation is provided by a bushing and washer 24 positioned within the opening 23 and over an area within the chamber 12 adjacent thereto. The lead 22 is also provided with a disc or plate 25 secured to the insulating bushing and washer 24 and acting as a capacitor plate for the RF frequency developed in the chamber 12. To the radio frequencies, this plate 25 appears to be a part of the wall of the chamber 12; to the direct current, the plate 25 and lead 22 appear to be isolated from the wall of the chamber 12.

At the end of the chamber 12 opposite the tuning member 15, there is provided an output passage or wave guide 26 integrally connected to the chamber 12. In order to provide a minimum drain on the chamber 12 and thus maintain the Q (resonant strength) of the chamber high, an end wall 27 with a slit 28 is provided for allowing a selected amount of energy to enter into the wave guide 26 for output purposes. It can be seen then that if a relatively low radio frequency signal, at the frequency $\omega$, is supplied to the input coaxial member 18, the high Q chamber 10 causes resonance at the input frequency, the diode 20 is energized at this frequency and, being of a non-linear characteristic nature, it develops strong currents of harmonic frequencies. These RF currents flowing through the diode 20 therefore introduce the harmonics into the chamber 11, and, since the chamber 11 is resonant at the third harmonic, a high third harmonic field is developed therein. If desired, an output from the third harmonic chamber could be provided. By action of the diode, this third harmonic ($3\omega$) field, in turn, sets up a high sixth harmonic ($6\omega$) current. The flow of this $6\omega$ current through the diode 20 acts to establish a strong $6\omega$ field within the chamber 12 which is tuned to have its resonance at $6\omega$. The energy of frequency $6\omega$ within the chamber 12 is then detected by the output wave guide 26 through the slit 28 and utilized in any desired manner (not shown).

In FIG. 5 there is shown an equivalent circuit with the major elements of the circuit of FIG. 4 identified therein. It can be seen that the nonlinear reactance 20 is common to all of the resonant circuits and therefore has the currents of each of the resonant circuits flowing therein. The higher the Q for each of the circuits, the greater the current flow through the nonlinear reactance 20.

Figure 6:
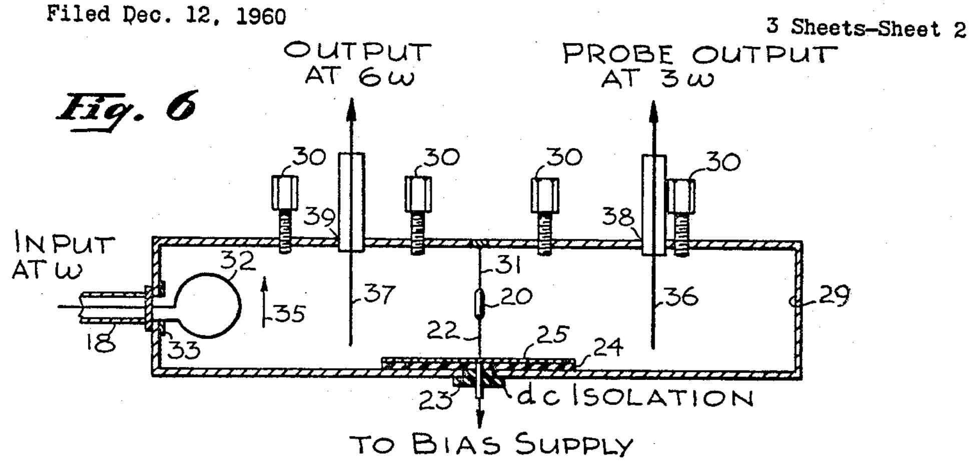
FIGS. 6 and 7 illustrate another embodiment of the present invention capable of developing a plurality of harmonics.
Figure 7:
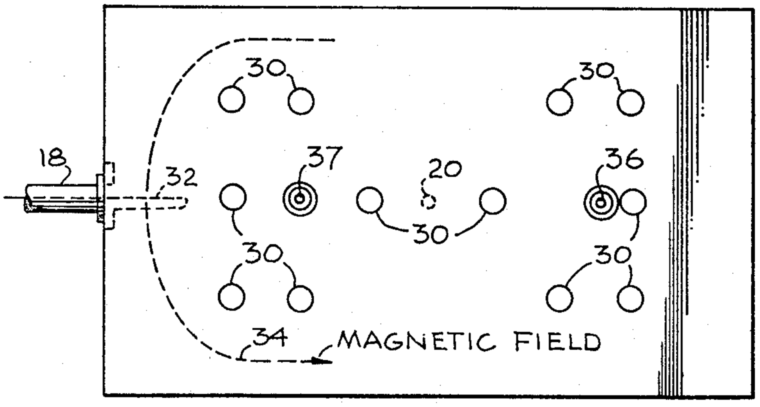

FIGS. 6 and 7 illustrate another embodiment of a harmonic generator in which a single chamber is provided that is resonant to the fundamental frequency $\omega$ and two harmonics, such as $3\omega$ and $6\omega$. In these two views, a resonant chamber 29 is tuned by suitable tuning screws 30 to provide resonance for each of the three frequencies involved in the system. In this arrangement, the nonlinear element 20 is connected to one wall of the chamber 29 by the lead 31 and to a D.-C. bias supply through its lead 22 and capacitor plate 25 in a manner similar to that shown in FIG. 4. In this system, however, the input is magnetically introduced to the chamber 29 through a loop 32 connected to the input coaxial conductor 18 which is inserted through an opening 33 in one wall of the chamber 29. The loop 32 establishes the magnetic field in the chamber 29 as illustrated by the arrow 34. The amount of input energy to be delivered to the chamber 29 can be varied by rotation of the loop 32 within the opening 33. The magnetic field, indicated by the arrow 34, establishes an electric field illustrated by the arrow 35 in FIG. 6, which is transverse to the magnetic field 34. The electric field at frequency $\omega$ causes current flow through the nonlinear diode 20 which establishes the harmonic frequency, with the third and sixth harmonics standing out due to the resonance of the chamber 29 as adjusted by the screws 30. It is pointed out that the placement of the tuning screws 30 is selected to have the greatest effect on the desired frequencies, whether they are the fundamental or the harmonics, in a manner such that the tuning to resonance of one of the frequencies with one of the tuning screws interferes least with the fields of the other frequencies. For example, the chamber 29 is built and adjusted by part of the screws 30 to be resonant at the fundamental frequency, with a second part of the screws 30 used to provide tuning for resonance at the third harmonic and the remaining part of the screws 30 being used to tune for the sixth harmonic. With the establishment of the fundamental and harmonics within the chamber 29, it is only necessary to provide probes such as the probes 36 for the third harmonic and 37 for the sixth harmonic entering through the openings 38 and 39, respectively, in the top plate of the resonant chamber 29. It is pointed out that the amount of energy to be taken out of the chamber can be adjusted by the depth at which the probes 36 and 37 are inserted into the chamber 29.

Figure 8:
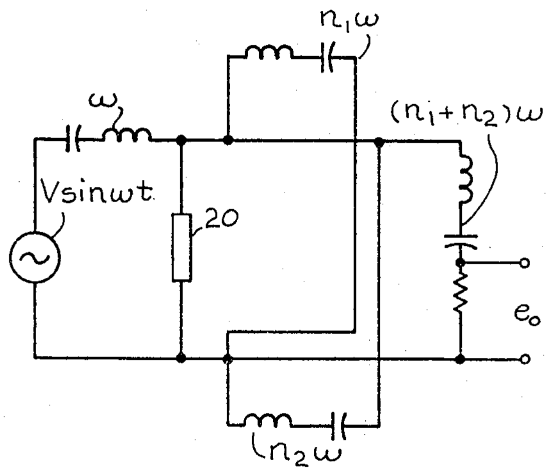
FIG. 8 is an equivalent circuit for the device of FIGS. 6 and 7.

In FIG. 8 there is illustrated an equivalent circuit of a device similar to that shown in FIGS. 6 and 7 except for the fact that the structure would include additional resonant chamber tuning to the sum of the two resonant frequencies for its output. In this case, the resonant chamber 29 is tuned to $\omega$, $n_1\omega$, $n_2\omega$, and $(n_1+n_2)\omega$. The output circuit would be responsive to the sum $[(n_1+n_2)\omega]$, which frequency is greater than either of the idling circuits used. It is pointed out that the idling circuits in each of these cases provide high Q circuits, causing relatively large current flows through the nonlinear element 20 which is necessary for mutual resonant circuit coupling.

In the embodiment of FIG. 9, the chamber 29 is provided with a ferrite chip 41 which is cut and shaped to provide the desired harmonic generation when subjected to a strong fundamental frequency $\omega$ while in a magnetic field having north and south poles 42 and 43, respectively. It is pointed out that the chamber 29 in FIG. 9 is also tuned to be resonant at the fundamental frequency $\omega$ and to the desired harmonic frequencies, as will be explained hereinafter.

FIG. 10(*a*) illustrates an input circuit to the chamber 29 through the use of a probe or loop 32 from the input conductor 18. This probe or loop 32 establishes a magnetic field as illustrated by the arrow 34. It is pointed out that FIG. 10(*a*) is referenced to the illustration in FIG. 9 by the identification of the corners 2, 3, 5, and 6 referring to the corners 2, 3, 5, and 6 in FIG. 9, showing the plane at which the magnetic field would be best seen. It is obvious, therefore, that the input circuit loop or probe 32 is introduced into the side of the chamber 29 transverse to sides 2, 3, 5, and 6 and having common corners to the corners 5 and 6. FIGS. 10(*b*) and 10(*c*) illustrate a typical output circuit in which the wave guide 26 is coupled into the chamber 29 through the opening 28. This opening is provided in the wall of the chamber identified by the corners 1, 2, 3, and 4 and is positioned to have propagated therethrough a portion of the electric field established therein, as described hereinafter. FIG. 10(*d*) illustrates the proper position of a monitoring probe 44 for the second harmonic introduced through the same wall as used for the input circuit. The amount of energy tapped out at this point is probably desirably very small, thus indicating a very limited amount of probe extension into the chamber 29.

FIGS. 11(*a*), 11(*b*), and 11(*c*) illustrate the electric fields $E_{\omega}$, $E_{2\omega}$, and $E_{3\omega}$, respectively, for the fundamental, second, and third harmonics generated within the chamber 29. These views also illustrate the positions of the electric fields with respect to selected walls of the chamber through the reference to the corners 1, 2, 3, 4, 5, and 6. It is noted that in FIG. 11(*a*) the tuning screw 30 is used to tune the chamber for the fundamental and is so positioned as to grossly affect the fundamental while in a location to least affect the third harmonic. In other words, the screw 30 is positioned within the wall 2, 3, 5, and 6 at a position of substantially high amplitude of the $E_{\omega}$ electric field and at a point where the $E_{3\omega}$ amplitude is substantially zero. Similarly, in FIG. 11(*c*), the tuning screw 30 used for tuning the third harmonic is placed at substantially the peak of the electric field $E_{3\omega}$ but at a position as far as possible down on the $E_{\omega}$ electric field potential. In FIG. 11(*b*), however, the tuning screw 30 for the second harmonic electric field $E_{2\omega}$ is transverse to the electric field established for the fundamental and third harmonic and therefore can be placed exactly at the peak of the electric field $E_{2\omega}$ and without regard to its position with respect to the fundamental and third harmonic.

In FIGS. 12(*a*) and 12(*b*) there are illustrated the magnetic fields $H_{2\omega}$ in FIG. 12(*a*), and $H_{\omega}$ and $H_{3\omega}$ in FIG. 12(*b*). The pattern of these magnetic fields as established by the harmonics generated by the ferrite when injected by the fundamental frequency $\omega$ is shown in each of these views in the proper orientation to the particular chamber 29 planes references by the numerals 1, 2, 3, 4, 5, and 6.

In FIG. 13 there is shown an alternate method of harmonic generation in which the ferrite 41 is shaped to be resonant in a magnetostatic mode at $\omega$ with the fundamental frequency $\omega$ introduced to the ferrite, with the ferrite placed within the introducing loop 32. The applied fundamental generates $H_{2\omega}$ within the ferrite which is also shaped to be resonant at $2\omega$. The fundamental $\omega$ and harmonic $2\omega$ currents combine in the ferrite 41 to generate $3\omega$ in the chamber 29 which is resonant at $3\omega$.

Although the illustrations used herein have been presented in terms of relatively high frequency, since this spectrum presents the greatest expected use of such circuits, it is pointed out that harmonic generations at frequencies such as audio frequencies can also be accomplished by the use of idling circuits.

While there has been described what is at present considered to be a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A harmonic generator comprising:
a resonant circuit;
a nonlinear element in said resonant circuit;
means for tuning said resonant circuit to a fundamental frequency;
a fundamental frequency signal input means connected to said resonant circuit for providing an input energy thereto,
said fundamental frequency signal input means causing fundamental frequency current flow in said nonlinear element,
said fundamental frequency current flow in said nonlinear element causing substantial current flow at harmonic frequencies;
at least one idler circuit connected to said nonlinear element and tuned to a selected harmonic of said fundamental frequency;
and at least one signal output circuit, connected to said nonlinear element, for deriving output signals having a frequency corresponding to the sum of said selected harmonic and said fundamental frequency.

2. A harmonic generator comprising:
a resonant circuit;
a nonlinear element in said resonant circuit;
means for tuning said resonant circuit to a fundamental frequency;
a fundamental frequency signal input means connected to said resonant circuit for providing an input energy thereto,
said fundamental frequency signal input means causing fundamental frequency current flow in said nonlinear element, said fundamental frequency current flow in said nonlinear element causing substantial current flow at harmonic frequencies;
an idler circuit connected to said nonlinear element and tuned to a selected harmonic of said fundamental frequency,
and at least one signal output circuit connected to said resonant circuit for deriving output signals having a frequency equal to the sum of the frequencies of said fundamental and at least one of said harmonics.

3. A harmonic generator comprising:
a resonant circuit;
a nonlinear element in said resonant circuit;
a fundamental frequency signal input means connected to said resonant circuit for providing an input energy thereto,
said fundamental frequency signal input means causing fundamental frequency current flow in said nonlinear element,
said fundamental frequency current flow in said nonlinear element causing substantial current flow at harmonic frequencies;
at least one idler circuit connected to said nonlinear element and tuned to a selected harmonic of said fundamental frequency,
and at least one signal output circuit connected to said resonant circuit for deriving output signals having frequencies substantially higher than said selected harmonic and corresponding to the sum of said fundamental and at least one of said harmonic frequencies.

4. A harmonic generator comprising:
a resonant circuit tuned to a fundamental frequency;
a nonlinear element in said resonant circuit;

a fundamental frequency signal input means connected to said resonant circuit for providing input energy thereto, said fundamental frequency signal input causing fundamental frequency current flow in said nonlinear element, a second resonant circuit having said nonlinear element therein, fundamental frequency current flow in said nonlinear element causing substantial current flow in said nonlinear element at frequencies corresponding to integral multiples of said fundamental frequency; and output circuit means for deriving output signals having a frequency corresponding to the arithmetic sum of the frequencies of said fundamental and at least one of said integral multiples.

5. A microwave harmonic generator comprising:

a source of first frequency electrical energy;

a non-linear reactance element, to which said energy is applied, for generating a current therethrough which includes at least first, second and third current components having first, second and third frequencies;

resonant circuit means including said element for maximizing said second and third current components;

and output circuit means for extracting power substantially only at a frequency which corresponds to the arithmetic sum of at least two of said three frequencies, and which is higher than any of said three frequencies.

6. In a microwave harmonic generator for developing appreciable output power at an output frequency substantially higher than that of any required input signal, a source of first frequency input power which is desired to be converted with reasonable efficiency to a high harmonic;

an impedance element which is characterized in that the current flow therethrough varies as a nonlinear function of the voltage applied thereto, and to which said input power is applied for inducing a current therethrough which includes a plurality of harmonic current components having different frequencies corresponding to different harmonics of said first frequency;

resonant circuit means coupled to include said impedance element for maximizing the amplitude of a plurality of the harmonic current components flowing through said impedance element so that the same functions as a mixer to produce substantial power at an output frequency corresponding to the arithmetic sum of the frequencies of a plurality of said harmonics;

and circuit means for extracting power substantially only at said output frequency.

7. A harmonic generator as defined in claim 4 wherein said nonlinear element is a square law semiconductor element.

8. A harmonic generator as defined in claim 4 wherein said nonlinear element is a ferrite chip shaped to provide selected harmonic frequencies.

9. A harmonic generator comprising: a first resonant circuit having a first resonant frequency;

a nonlinear element in said resonant circuit;

input means for energizing said nonlinear element with a fundamental frequency;

a second resonant circuit having said nonlinear element therein and having a second resonant frequency corresponding to a harmonic of said fundamental frequency;

and an output resonant circuit having said nonlinear element therein and having a resonant frequency corresponding to the summation of said first and second resonant frequencies.

10. A harmonic generator comprising:

a resonant circuit means tuned to resonate at a fundamental frequency and at least one harmonic frequency;

a nonlinear element in said resonant circuit means;

input means for energizing said nonlinear element with at least a fundamental frequency, said input means including a magnetic field establishing loop;

said nonlinear element being positioned within the magnetic field established by said loop;

said nonlinear element generating a plurality of harmonic frequencies in response to fundamental frequency energization of same;

and at least one signal output circuit, connected to said resonant circuit means, for extracting energy having a frequency equal to the arithmetic sum of said fundamental frequency and at least one of said harmonic frequencies.

11. An ultrahigh frequency harmonic generator in accordance with claim 3, wherein:

said nonlinear element comprises a variable capacitance semiconductor diode;

said idler circuit is tuned to maximize at least the second harmonic current flow through said diode;

and said output circuit comprises an ultrahigh frequency transmission line structure, coupled to electrically include the reactance of said diode, for extracting output power substantially only at an ultrahigh frequency corresponding to another and higher harmonic of said fundamental frequency.

12. A microwave harmonic generator in accordance with claim 3, wherein:

said nonlinear element comprises a variable capacitance semiconductor device;

said idler circuit includes a microwave resonant chamber tuned to maximize at least the second harmonic current flow through said semiconductor device;

and said output circuit comprises a microwave transmission line structure arranged and constructed to extract appreciable output power substantially only at another and higher harmonic of said fundamental frequency.

References Cited in the file of this patent

UNITED STATES PATENTS

| | | |
|---|---|---|
| 2,897,452 | Southworth | July 28, 1959 |
| 2,961,617 | Stern | Nov. 22, 1960 |
| 3,025,448 | Muchmore | Mar. 13, 1962 |
| 3,060,365 | Crandell | Oct. 23, 1962 |